T. M. BROWN.
NUT TIGHTENER.
APPLICATION FILED AUG. 26, 1918.

1,312,889.

Patented Aug. 12, 1919.
2 SHEETS—SHEET 1.

INVENTOR
THEOPHILUS M. BROWN
BY
Horace Barnes
ATTORNEY.

T. M. BROWN.
NUT TIGHTENER.
APPLICATION FILED AUG. 26, 1918.
1,312,889.
Patented Aug. 12, 1919.
2 SHEETS—SHEET 2.
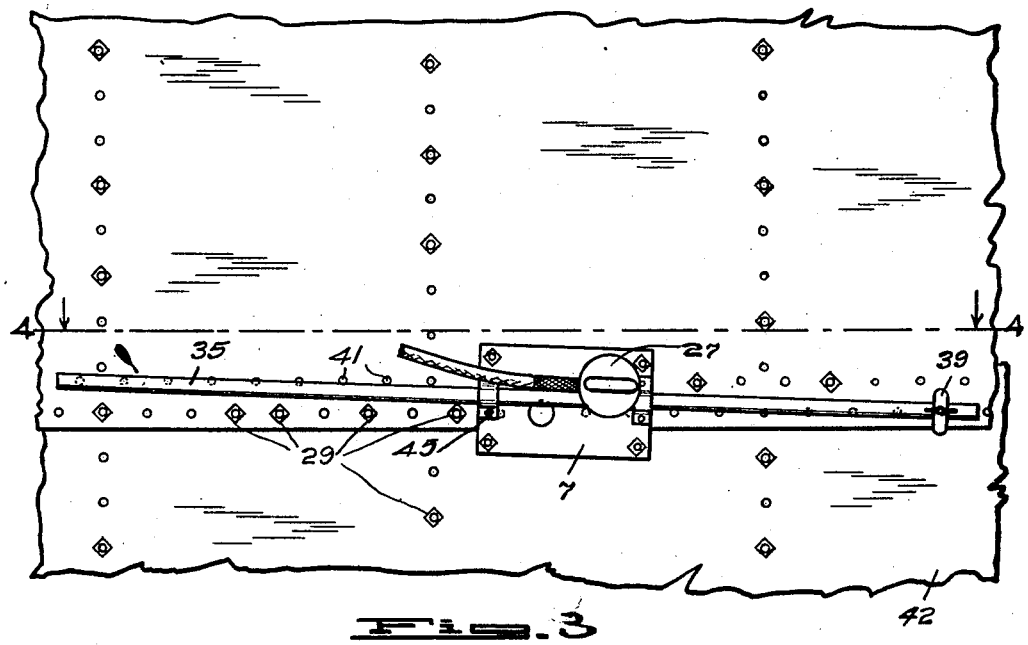
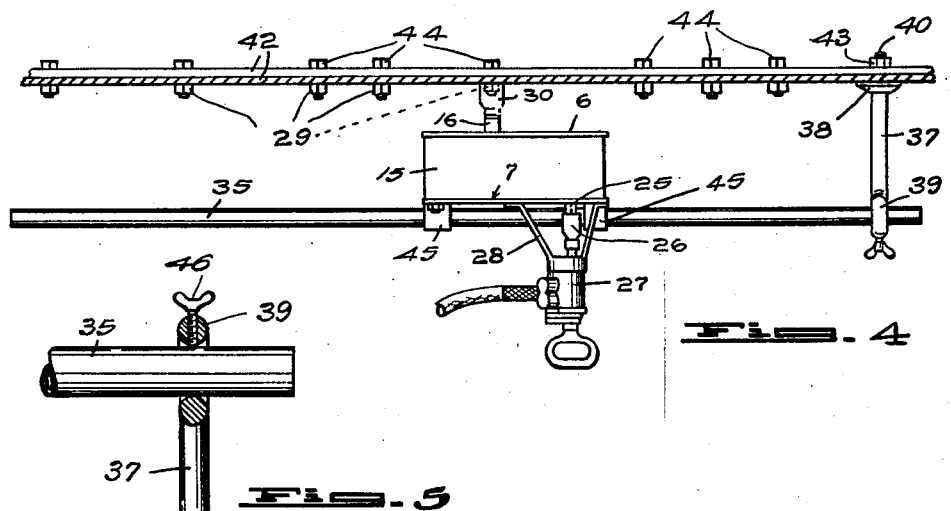
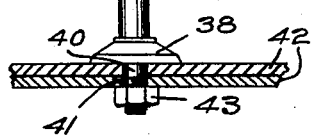
INVENTOR
THEOPHILUS M. BROWN
BY
ATTORNEY

UNITED STATES PATENT OFFICE.

THEOPHILUS M. BROWN, OF SEATTLE, WASHINGTON.

NUT-TIGHTENER.

1,312,889.  Specification of Letters Patent.  Patented Aug. 12, 1919.

Application filed August 26, 1918. Serial No. 251,376.

*To all whom it may concern:*

Be it known that I, THEOPHILUS M. BROWN, a citizen of the United States, and resident of the city of Seattle, county of King, State of Washington, have invented certain new and useful Improvements in Nut-Tighteners, of which the following is a clear and exact specification.

This invention relates to improvements in nut tightening devices, and more particularly to improvements in devices of this class that are especially adapted to be used in bolting together the steel plates of a ship's hull preparatory to riveting.

The object of this improvement is to provide a strong and simple power actuated device that may be used with great rapidity for turning the nuts onto or off of bolts.

A further object is to provide simple and efficient means for supporting the device in an operative position when it is used for tightening the nuts on a plurality of bolts that are arranged in close proximity to each other.

The invention consists in the novel construction, adaptation and combination of parts of a nut tightener and supporting mechanism therefor as will be more clearly hereinafter described, and claimed.

Figure 1:
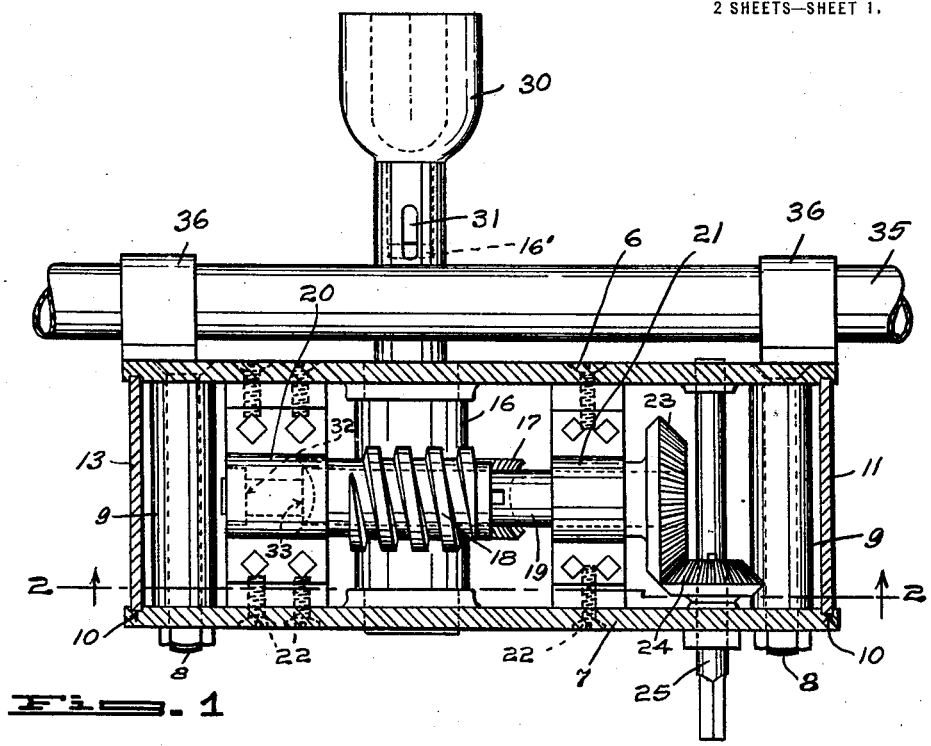
Figure 2:
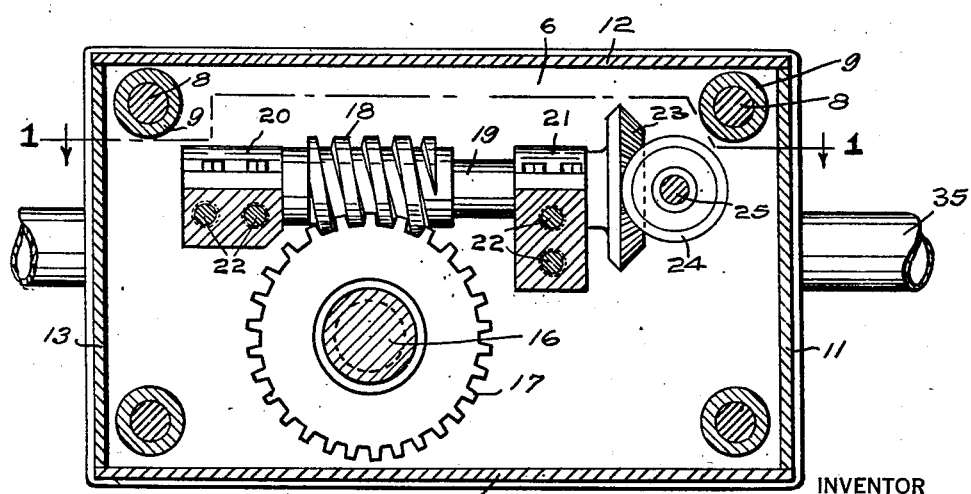

In the accompanying drawings Figure 1 is a view partly in elevation and partly in cross section on a broken line 1—1 of Fig. 2 of a device constructed in accordance with this invention; Fig. 2 is a view in cross section of the same on broken line 2—2 of Fig. 1, certain parts being shown in elevation; Fig. 3 is a somewhat diagrammatic view in elevation illustrating mechanism for supporting the device for use on the sides of a ship, the arrangement of parts shown in Fig. 3 differing slightly from the arrangement of parts shown in Figs. 1 and 2; Fig. 4 is a view in sectional elevation substantially on broken line 4—4 of Fig. 3 and Fig. 5 is an enlarged view partly in elevation and partly in section illustrating the method of securing a supporting bar to the sides of a ship.

In the construction of large steel ships the plates that form the hull of the ship are first secured together by bolts to hold them in place and are then riveted. The operation of bolting the plates together necessitates the expenditure of a large amount of time and labor owing to the fact that the bolts must be inserted in the rivet holes at frequent intervals and the nuts must be tightened sufficiently to draw the adjacent plates firmly together and hold them firmly in contact with the frame of the ship.

In practice it is customary to slip a piece of pipe over the handle of an ordinary wrench so that a lever of three or four feet in length is formed and it is often necessary where the plates are not exactly the correct shape to tighten the nuts by imparting a slight turn to first one and then another along a seam or line where rivets are to be driven until the two overlapping plates are drawn together.

This method is unsatisfactory owing to the fact that it consumes a great deal of time to tighten a nut where so long a leverage on the wrench is necessary, and also owing to the fact that the operator is liable to exert too great a strain and strip the threads of the bolt or nut.

The present device overcomes these difficulties to a large extent by providing means whereby power may be applied to screw a nut on quickly and whereby only a safe load may be placed on any one bolt the machine being adapted to exert a certain maximum torque which is not sufficient to twist off the bolts or to strip the threads of the bolts and nuts that are being used.

Referring to the drawings throughout which like reference numerals designate like parts, the numerals 6 and 7 respectively designate the two side plates of a casing or housing that are rigidly secured to each other in spaced apart relation by bolts 8 around which are disposed sleeves 9 that serve as spacing members between the two plates 6 and 7, the bolts 8 preferably being located near the four corners of the housing.

Disposed between the side plates 6 and 7 adjacent the four edges thereof and adapted to fit within grooves 10 in such plates are four other plates 11, 12, 13 and 15 that complete the inclosure of the housing and make it possible to fill the same with suitable lubricant in which the gears hereinafter described may run.

Extending crosswise of the housing and journaled in the plates 6 and 7 is a shaft 16 upon which is fixedly keyed a worm wheel 17 that is normally engaged by a worm 18 on a shaft 19 that is journaled in suitable bearing blocks 20 and 21 arranged crosswise of the housing and secured to the plates 6 and 7 by screws 22.

One end of the shaft 19 is provided with a bevel gear 23 that is arranged to mesh with another bevel gear 24 on a shaft 25 that is journaled in the plates 6 and 7 and projects from one side of the housing in such a manner that it may be inserted within the chuck 26 of an air motor 27.

The air motor 27 may be of any standard well known type of construction and may be secured to the housing of the nut tightener by a bracket 28.

The end of the shaft 16 that projects outwardly from the plate 6 is recessed as at 16' for the reception of the end of a socket wrench 30 which may be suitably formed to fit the nuts 29 that are to be tightened.

The outwardly projecting end of the shaft 16 is provided with a slot 31 that extends radially therethrough at the base of the recess 16' that receives the shank of the socket wrench 30 so that a tapered instrument may be driven therein to force the socket wrench outwardly when it is to be removed.

The shaft 19 is preferably shouldered within the bearing 20, as at 32 and 33 to resist end thrust due to the meshing of the worm 18 with the worm wheel 17.

The nut tightener housing is adapted to be supported in operative position with respect to the side of a ship by a bar or pipe 35 that passes through brackets 36 that are secured to the plate 6.

One end of the bar 35 is secured within an eye 39 in the outer end of a standard 37, see Fig. 5, that is provided on its inner end with a fixed collar 38 from which projects a stud 40 that is adapted to pass through holes 41 in the plates 42 that form the side of the ship and to be secured to the plates 42 by a nut 43, the nut 43 being ordinarily left relatively loose so that the standard 37 may be turned in the holes.

The other end of the bar 35 will be held manually so that it may be raised or lowered at will to permit the socket wrench 30 to be placed over different nuts 29 on the bolts 44 that are used for bolting the plates 42 together.

The housing may be moved lengthwise of the bar by the person that is operating the nut tightener.

In Figs. 3 and 4 I have shown the supporting bar 35 as secured to the outermost plate 7 by brackets 45 instead of being secured to the innermost plate 6 by the bracket 36 as shown in Figs. 1 and 2.

Where the bar 35 is thus disposed on the outside of the housing the weight of the air motor 27 tends to balance the weight of the housing and actuating mechanism contained therein and renders the device easier for the operator to support. It also makes it possible to shorten the end of the shaft 16 that receives the socket wrench 30 but necessitates the lengthening of the standard 37.

The eye portion 39 of the standard 37 is preferably round in cross section and of slightly larger internal diameter than the exterior of the bar 35 so that a limited movement of the bar 35 toward and away from the ship may be afforded. The eye portion 39 is also preferably provided with a thumb nut 46 which may be tightened against the bar 35 to prevent it from slipping out of the eye 39.

In operation the standard 37 is secured to the side of the ship adjacent the nuts that are to be tightened, and the bar 35 on which the nut tightener is carried is inserted in the eye 39.

The operator holds the nut tightener in such a manner that he can place the socket wrench 30 over any nut that is to be tightened and also control the inlet of air under pressure to the air motor and an assistant supports the free end of the bar 35 and moves such bar at the direction of the director.

It will thus be seen that the nut tightener is prevented from turning by the bar 35 and that it may be easily held by the operator at all times.

The air motor is preferably reversible so that the socket wrench may be turned in either direction.

By interposing the worm transmission and bevel gears between the air motor and the socket wrench the speed of rotation of the wrench relative to the motor is greatly reduced and the torque or turning power is greatly increased so that by a correct design the device may be made to exert the maximum strain that a bolt and nut of predetermined size and strength are capable of safely withstanding before the motor will be stalled but, may be made so that it will not exert sufficient torque to twist off the bolt or to strip the threads of the bolt or nut.

This device is especially advantageous in instances where the plates that are to be bolted together are warped or sprung so that the nuts on the bolts are hard to turn and must be turned many times before the plates are drawn together.

It will be understood that power for turning the shaft 25 may be derived from sources other than the air motor herein shown and that changes in the form of construction and arrangement of the various parts of the nut turning device may be made within the scope of the appended claims.

What I claim and desire to protect by Letters Patent is—

1. A device for tightening nuts in the hulls of steel ships comprising a bar, a support pivotally secured to the hull of a ship and projecting outwardly therefrom one end of said bar being secured to said support and the other end of said bar being adapted to be manually supported whereby said bar may be oscillated about its pivotal connection, and a power actuated nut tightener supported by said bar and movable lengthwise thereon, the said bar preventing the said nut tightener from turning when torque is exerted to turn a nut.

2. A nut tightening device for bolting up plates on the hull of a steel ship comprising a housing, a shaft projecting from one side of said housing and adapted to engage a nut, another shaft projecting from another side of said housing, a motor connected with said last named shaft, speed reduction gears located in said housing and interposed between said first named shaft, and said last named shaft, and a bar pivotally connected at one end to the hull of said ship and adapted to be manually supported at the opposite end said housing being carried on said bar and movable lengthwise thereof.

3. A nut tightening device for bolting up plates on the hull of a ship comprising a housing, a shaft disposed crosswise thereof and projecting outwardly from one side of said housing, a worm wheel on said shaft, a socket wrench on the outwardly projecting end of said shaft, a worm shaft disposed at right angles to said first named shaft, a worm on said worm shaft and disposed to mesh with said worm wheel, a driving shaft extending crosswise of said housing, bevel gears connecting said driving shaft with said worm shaft, a motor secured to said housing and adapted to rotate said driving shaft, and a bar pivotally connected at one end to the hull of said ship, said bar being adapted to be manually supported at the opposite end and said housing being carried on said bar and movable lengthwise thereof.

4. A nut tightening device for bolting up plates on the hull of a ship, comprising a grease tight housing, brackets secured to one side of said housing, a bar slidable through said brackets, means for pivotally securing one end of said bar to the hull of said ship, the other end of said bar being adapted to be supported manually, a shaft disposed crosswise of said housing and projecting outwardly from one side thereof, a socket wrench connected with the outwardly projecting end of said shaft, bearing supports extending crosswise of said housing, a worm shaft journaled in said bearing supports, a worm fixed on said worm shaft and disposed to mesh with said worm wheel, a driving shaft, gears connecting said driving shaft and said worm shaft, and means for rotating said driving shaft.

Signed this 7th day of August, at Seattle, Washington, A. D. 1918.

THEOPHILUS M. BROWN.

Copies of this patent may be obtained for five cents each, by addressing the "Commissioner of Patents, Washington, D. C."